United States Patent Office 3,547,971
Patented Dec. 15, 1970

3,547,971
PREPARATION OF DIOXABORINANE
COMPOUNDS
Richard H. Fish, Anaheim, and Herbert C. Newsom, Whittier, Calif., assignors to United States Borax & Chemical Corporation, Los Angeles, Calif., a corporation of Nevada
No Drawing. Filed Apr. 27, 1967, Ser. No. 634,137
Int. Cl. C07f 5/04
U.S. Cl. 260—462                    9 Claims

ABSTRACT OF THE DISCLOSURE

Alkyl-substituted 1,3-dioxa-2-borinane compound having at least one alkyl subsituent in the 4, 5, or 6 position are prepared by reaction of the corresponding oxy-bis-(1,3-dioxa-2-borinane) compound with a reducing agent. Preferably, the reaction takes place with an excess of reducing agent and in the presence of a glycol ether solvent.

---

This invention relates to the preparation of alkyl-substituted 1,3-dioxa-2-borinane compounds. The alkyl-substituted 1,3-dioxa-2-borinane compounds are described and claimed in a copending application of William G. Woods and Philip L. Strong, Ser. No. 502,465, filed Oct. 22, 1965, now Pat. No. 3,383,401. According to said copending application, the compounds can be prepared by reaction of a 2-halo-1,3-dioxa-2-borinane with a reducing agent such as sodium borohydride. The present method offers the advantage of using an oxy-bis(1,3-dioxa-2-borinane) as an intermediate which is more readily available and easily prepared than the 2-halo-1,3-dioxa-2-borinanes, the intermediate employed by Woods et al.

According to the present invention, there is provided a facile method for producing compounds of the formula

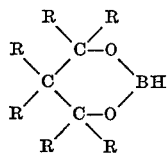

where each R is selected from hydrogen and alkyl of from 1 to about 4 carbon atoms and at least one of the said R's is alkyl. The method of the present invention comprises reacting an oxy-bis(1,3-dioxa-2-borinane) compound with a reducing agent to give the desired alkyl-substituted 1,3-dioxa-2-borinane compound. The method of preparation can be illustrated by the following equation:

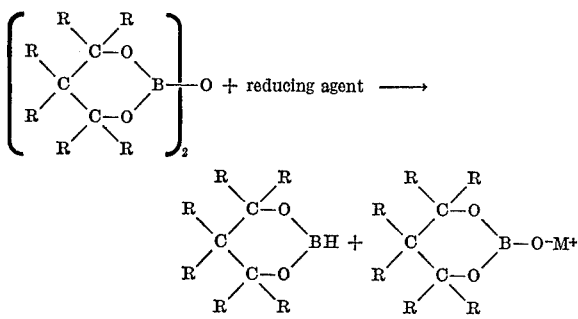

in which R has the significance previously assigned and M reprsents the cation of the reducing agent. The compounds produced by the present process are useful as reducing agents as described in said copending application of Woods et al.

In the method of the present invention, the oxy-bis(1,3-dioxa-2-borinane) is reacted with a reducing agent such as lithium aluminum hydride, lithium borohydride, sodium hydride, sodium borohydride or lithium tri-t-butoxyaluminum hydride. Preferably, an excess of the reducing agent is employed in the reaction medium, such as obtained by adding the oxy-bis(1,3-dioxa-2-borinane) to the reducing agent. Also, we prefer that an inert organic solvent, such as the glycol ethers, be employed as a liquid reaction medium so as to maintain efficient control of the reaction temperature and also to facilitate handling of the reactants. When such a solvent is employed, relatively low reaction temperatures are required, such as about 0° to about 50° C., with ambient temperatures being quite suitable. Higher reaction temperatures can, of course, be employed, but they do not appear to offer any advantages. The desired 1,3-dioxa-2-borinane compound is readily separated from the reaction mass by distillation especially under reduced pressures.

The following examples illustrate the method of the present invention but it is to be understood that the invention is not to be limited to the specific examples given.

EXAMPLE I 4,4,6-trimethyl-1,3-dioxa-2-borinane

To a stirred suspension of 7.5 grams (0.15 mole) of powdered lithium aluminum hydride in 120 ml. of tetraglyme was added 80.28 grams (0.30 mole) of oxy-bis-(4,4,6-trimethyl-1,3-dioxa-2-borinane) at room temperature. The addition required about 30 minutes and the mixture was then stirred an additional 30 minutes at room temperature. Distillation under reduced pressure gave 32.3 grams (85% yield) of the desired 4,4,6-trimethyl-1,3-dioxa-2-borinane, B.P. 50°–52.5° C. (46 mm.).

EXAMPLE II

The procedure of Example I was followed except lithium borohydride was employed at the reducing agent instead of lithium aluminum hydride. Distillation under reduced pressure gave the desired 4,4,6-trimethyl-1,3,2-dioxa-2-borinane in a lower yield than that obtained in Example I.

The following are among the many other compounds which can be prepared by the method of the present invention:

4-methyl-1,3-dioxa-2-borinane
5,5-dimethyl-1,3-dioxa-2-borinane
5-butyl-5-ethyl-1,3-dioxa-2-borinane
5-methyl-5-ethyl-1,3-dioxa-2-borinane The glycol ethers which can be used generally have a boiling point of at least about 120° C. Typical examples of such solvents are:

diethylene glycol dimethyl ether (diglyme)
triethylene glycol dimethyl ether (triglyme)
tetraethylene glycol dimethyl ether (tetraglyme)

Various changes and modifications of the invention can be made and, to the extent that such variations incorporate the spirit of this invention, they are intended to be included within the scope of the appended claims.

What is claimed is:
1. The method of preparing a compound of the formula

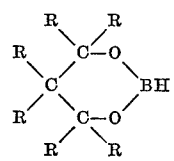

which comprises reacting an oxy-bis(1,3-dioxa-2-borinane) compound of the formula

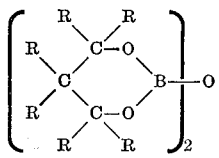

with a reducing agent at a temperature of about 0° to about 50° C. in a liquid inert organic medium, in which each R is individually selected from the group consisting of hydrogen and alkyl of from 1 to about 4 carbon atoms, at least one of said R's being alkyl, said reducing agent being selected from the group consisting of hydrides, borohydrides and aluminum hydrides of sodium and lithium.

2. The method according to claim 1 in which said reaction takes place in the presence of a liquid glycol ether.

3. The method according to claim 1 in which said reducing agent is lithium aluminum hydride.

4. The method according to claim 1 in which said oxy-bis(1,3-dioxa-2-borinane) compound is oxy-bis(4,4,6-trimethyl-1,3-dioxa-2-borinane) and said reducing agent is lithium aluminum hydride.

5. The method according to claim 1 in which said reducing agent is lithium borohydride.

6. The method according to claim 1 in which said reaction takes place at room temperature.

7. The method according to claim 1 in which said oxy-bis(1,3-dioxa-2-borinane) compound is added to said reducing agent.

8. The method according to claim 7 in which said oxy-bis(1,3-dioxa-2-borinane) compound is oxy-bis(4,4,6-trimethyl-1,3-dioxa-2-borinane) and said reducing agent is lithium aluminum hydride suspended in a glycol ether.

9. The method according to claim 8 in which said glycol ether is a liquid having a boiling point of at least about 120° C.

References Cited
UNITED STATES PATENTS

| | | | |
|---|---|---|---|
| 2,992,072 | 7/1961 | Huff et al. | 260—462 |
| 3,383,401 | 5/1968 | Woods et al. | 260—462 |

LEON ZITVER, Primary Examiner

L. D. CRESCENTE, Assistant Examiner